United States Patent Office 3,176,327
Patented Apr. 6, 1965

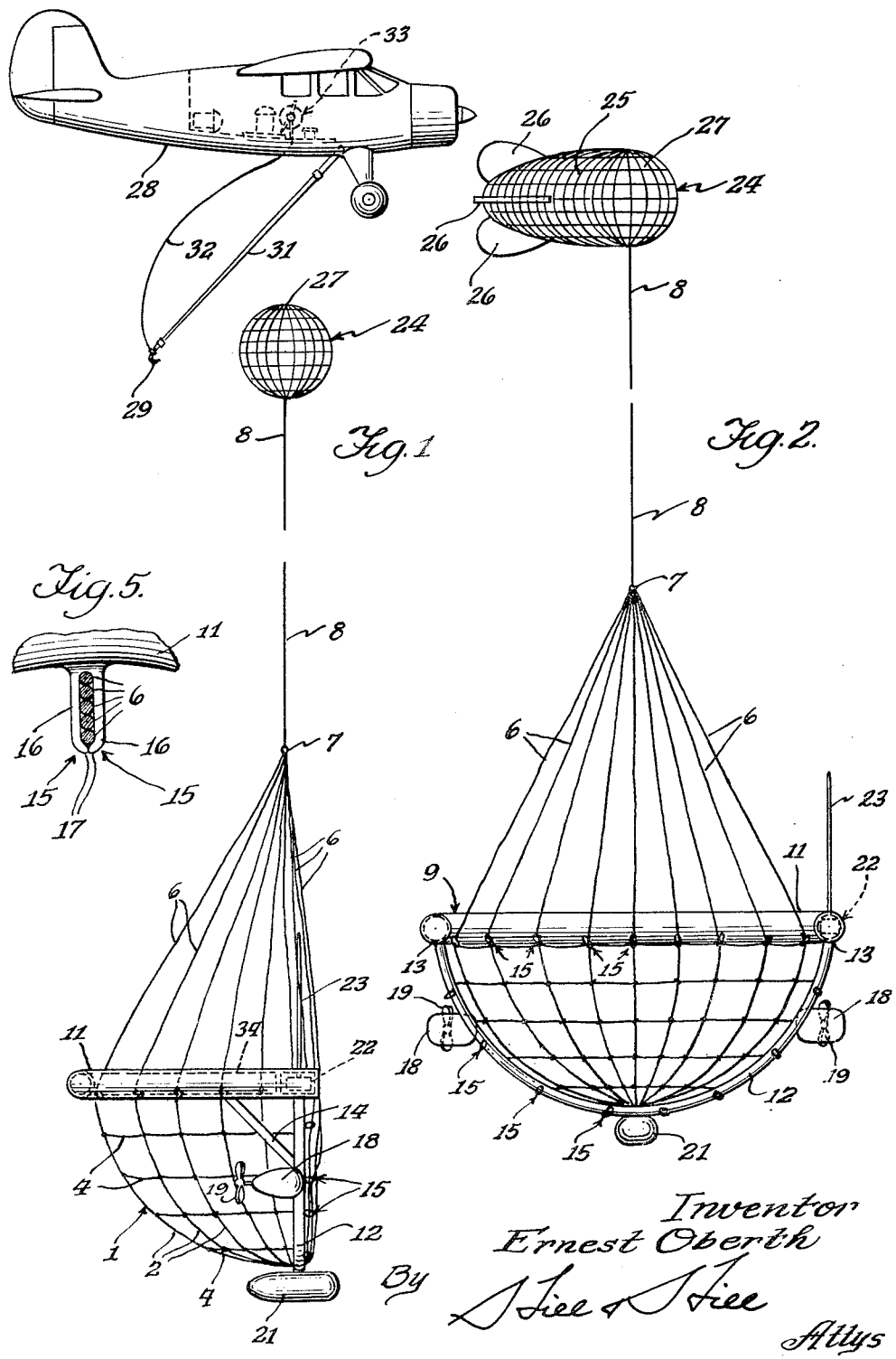

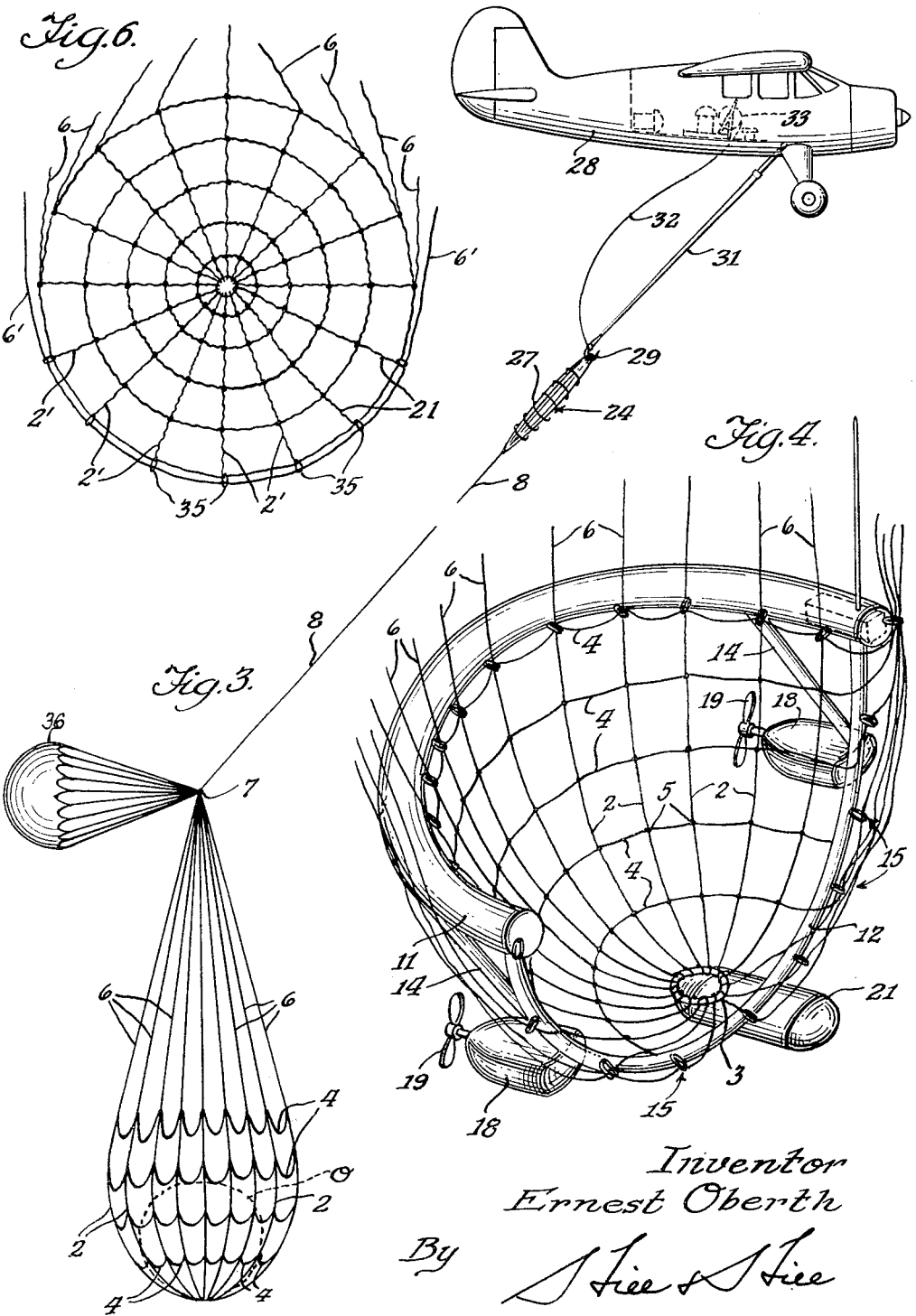

3,176,327
PICKUP SYSTEM
Ernest Oberth, 3215 N. Francisco Ave., Chicago, Ill.
Filed Mar. 27, 1961, Ser. No. 98,639
31 Claims. (Cl. 9—14)

The invention relates generally to aerial pick-up systems and more particularly to systems for high performance aircraft in flight.

There have been numerous systems and devices designed for aerial pick-up operations, but to the present time a highly efficient system has not been evolved.

A successful aerial pick-up system must fulfill a number of requirements, the most important of which is adequate safety, particularly where personnel are involved. Such a pick-up also should be generally flexible in design with the same general operations being utilizable in ground to air and sea to air pick-ups either for cargo or personnel. Similarly, the system should be capable of application to high performance aircraft in flight as well as low performance aircraft. In addition, as subsequently discussed, the system preferably should have a number of other characteristics.

The present invention has among its objects the production of an aerial pick-up system which is especially suitable for high performance aircraft, capable of employment for both ground to air and sea to air pick-ups with maximum safety in operation.

Another object of the invention is the production of such a pick-up system which permits air-sea rescue pick-up and the like without any action required on the part of personnel to be picked up.

A further object of the invention is the production of such a pick-up system which is compact and can be easily stored, enabling its use as an emergency device and thus could be utilized wherever use of such type of equipment might be involved, as for example, various forms of vessels, including life boats, life raft equipment, as part of a life preserver structure, etc.

A further object of the invention is the production of such an aerial pick-up system which is designed to provide dependable pick-up, presenting a relatively large target for engagement by the pick-up engaging elements of the plane, such target preferably being a suitable airborne object such as a balloon or the like.

A further object of the invention is the production of a novel retriever structure for use in sea-air pick-ups which may be remotely controlled, whereby floating objects in a body of water may be recovered without any action on the part of the person or object to be picked up.

Many other objects and advantages of the construction herein shown and described will be obvious to those skilled in the art from the disclosure herein given.

In the drawings, wherein like reference characters indicate like or corresponding parts:

FIG. 1 is a side elevational view of a pick-up structure embodying the present invention, illustrating the same in relative position for pick-up by an airplane;

FIG. 2 is a front view of the retriever and balloon structure illustrated in FIG. 1;

FIG. 3 is a view similar to FIG. 1 following pick-up by the airplane;

FIG. 4 is a perspective view of the retriever structure;

FIG. 5 is a plan view of a line retaining hook which may be employed with a plurality of object containers; and FIG. 6 is a plan view of a modified container structure.

In the past there have been numerous systems devised for picking up objects from land or sea, all of which have generally involved engagement of a suitable hook with a line, usually supported or tensioned along a horizontal line. In most cases the line is suitably attached to the object to be picked up, the end of the line terminating in a loop, a portion, of which could be suspended along a generally horizontal line between two supporting uprights which were a part of the ground structure and from which the tow rope was to be withdrawn by engagement with a hook carried by the passing airplane. In such cases the hook is usually suspended from a trailing boom attached to the fuselage of the airplane. Some systems have involved a reversal of the line and hook, the plane carrying two fork-like booms which diverge from the plane mounting and connected at their free ends by a length of rope which is adapted to engage a grapple-hook suitably supported from an upright on the ground or carried by a suitable floating object.

The present invention contemplates the utilization of an object receiving container which preferably may be in the form of a net structure adapted to be initially supported in operative position for receiving the object by suitable means, either ground or water supported, and from which the object container may be detached at the time of pick-up, together with a relatively large airborne target which may be in the form of a balloon or the like and so constructed that operative connection between the plane and the tow line may be achieved by striking the balloon with hook means carried by the aircraft.

The invention also contemplates the production of a novel sea retrieving unit which is so designed that it may be operated by remote control to pick up an object floating on the sea.

The invention may be employed in various forms, depending upon the particular application involved, whether ground pick-up, sea pick-up, etc. is involved. The invention is illustrated in the drawings in connection with a water borne unit particularly adapted for retrieving objects or persons in water and is illustrated in connection with a floating retriever structure which is adapted to normally support the object receiving container, the tow line, and the means for positioning the latter for engagement with the pick-up by an aircraft. These components preferably are arranged as a packaged unitary assembly which, for example, may be dropped from an aircraft to a point in the vicinity of the object to be picked up. Following receipt of such object in the pick-up container, the line supporting means may be placed into an operating position and, following operative engagement with the pick-up aircraft, the pick-up container is adapted to be detached from the supporting structure which carried the same in the water.

Referring to FIGS. 1 through 5, the reference numeral 1 indicates generally a pick-up container illustrated as being constructed in the form of an open net or the like, which may be fabricated from strands of suitable material such as cord, wire, synthetic materials such as nylon, or other plastics, etc., depending upon the size of the container and the nature of the objects to be picked up thereby. The net preferably is of a generally self-sustaining character whereby it will tend to maintain its operative position for receipt of an object, but at the same time sufficiently pliable or deformable to permit the same to be gathered up to form an object retaining bag.

The container 1 is illustrated in FIGS. 1, 2 and 4 as comprising a plurality of generally radially disposed lines 2 which are suitably connected, as for example, by a ring element 3 at their corresponding ends, forming a center point about which a plurality of concentric lines 4 are disposed, the lines 2 and 4 being suitably secured at their crossing points 5 to form an open net structure. Extending from the net structure thus described, at the junctures of the lines 2 with the outermost concentric line 4, are plurality of tie or shroud lines 6 which may be continuations of the lines 2, or in the event the lines 6 are desired to be of a different character than the lines 2, the lines 6 may be joined with the lines 2 and 4 in a suitable manner.

The opposite ends of the lines 6 may be joined together in suitable manner at a substantially common point indicated by the numeral 7 in the drawings and at such point may be operatively connected to one end of a tow line 8.

In certain applications the container may be other than a net structure, utilizing for example, a bag of fabric, plastic or other sheet material, or even of relatively rigid materials.

The pick-up container 1 is adapted to be carried by a non-rigid object receiving and/or non-rigid supporting structure or retriever indicated generally by the numeral 9 which comprises a generally semi-circular member 11 which may be of hollow construction whereby it will float on top of the water, the particular embodiment illustrated including a semi-circular frame member 12, the plane of which is illustrated as extending normal to the plane of the float member 11, with the ends of the member 12 being suitably connected to the adjacent ends of the member 11 as indicated at 13. The semi-circular member 11 and semi-circular frame member 12 provide the non-rigid periphery of said non-rigid object-receiving supporting structure 9. If desired, suitable brace members 14 may be provided extending diagonally between the adjacent ends of the members 11 and 12 to provide a relatively rigid structure.

The members 11 and 12 are provided with suitable means for retaining the container 1 in operable position as illustrated in FIGS. 1, 2 and 4, such means comprising eye members indicated generally by the numeral 15 which are illustrated as comprising oppositely disposed portions 16 having their free ends 17 in opposed relation, the portions 16 being of a material so proportioned that they have sufficient resilience to permit a line 2 to be withdrawn therefrom under the applied stresses resulting from pick-up of the container by an aircraft, but having sufficient rigidity to otherwise retain the lines in engagement with the supporting structure 9 under normal operating conditions. The tie members 15 are so disposed on the members 11 and 12 as to permit the adjacent lines of the net to be engaged therewith and form an arcuate shaped receptacle comprising approximately one-quarter of a sphere, the receptacle thus formed being open in the plane of the member 12 as well as generally in the plane of the member 11. In some cases it may be desirable to use other types of line locks, as for example, electromagnetic locks which could be suitably operated by remote control.

The non-rigid object supporting structure 9 may be provided with suitable propulsion means which, in the embodiment illustrated, comprises a pair of motor assemblies 18 carried by the supporting structure 9 adjacent the juncture of the members 14 with the member 12, each motor assembly having a propeller 19 connected to a suitable power source, as for example, an electric motor which may be battery powered, as for example, by batteries carried in a receptacle 21 carried by the member 12 at substantially the mid point thereof whereby the batteries and their container may form a stabilizing ballast for the structure. With other forms of retriever structure the batteries may be directly associated with the motor or otherwise suitably located.

The retriever may also be provided with control means indicated generally by the numeral 22, illustrated as being carried in the member 11 adjacent one end thereof, by means of which the retriever may be guided to the object to be picked up. Depending upon the particular application of the invention, the control means 22 may assume various forms, as for example, a radio operated remote control mechanism, including a radio receiver having a receiving antenna 23 by means of which the operation of the motors 18 may be individually controlled. Thus, by varying the speed of one motor with respect to the other, the retriever may be steered in any desired direction so that it may be operated under the control of the employing personnel.

The control may be effected by other means, as for example, a suitable homing mechanism which could be radar controlled, responsive to infra-red rays, or sonar responsive.

The tow line 8 is adapted to be supported for pick-up by the aircraft by means of a suitable airborne device, as for example, a balloon 24, illustrated as being of a kite type, capable of being maintained in a stabile position.

The balloon illustrated comprises an inflatable envelope 25 of generally aerodynamic shape, having stabilizing fins 26 extending therefrom, the envelope being connected to the tow line 8 through suitable hook engageable line means, illustrated in the present embodiment of the invention as comprising a net-like structure 27 which confines the envelope 25 therein.

The balloon 24 provides an excellent target for the aircraft 28 which carries a suitable hook element 29 illustrated as being detachably carried by a rigid or flexible boom at the free end of the latter, the opposite end being suitably connected to the aircraft 28, the hook 29 being secured to a line 32 adapted to be operatively carried by suitable winch means indicated generally by the numeral 33 located in the aircraft. Likewise, the net-like structure 27 provides a plurality of hook-engageable elements insuring efficient and dependable engagement of the hook therewith.

In operation, the balloon 24, tow line 8 and lines or shrouds 6 are suitably disposed about the member 11 so that the non-rigid retriever or non-rigid supporting structure 9 forms a generally arcuate shaped structure corresponding generally to a quarter of a hollow sphere. The retriever may, for example, be transported by means of the pick-up aircraft to the location of the object to be picked up and suitably deposited in the water, following which the propulsion means on the retriever may be suitably actuated to direct the retriever to the object, the open end of the retriever facing the object so that it may be readily received therein. A suitable supply of gas for the deflated balloon 24 is provided, which may be conveniently disposed in the hollow member 11, the latter forming an ideal tank 34 for such gas, with the filling of the balloon being suitably accomplished by remote control mechanism actuated through the receiver 22 or by other suitable means responsive to the homing mechanism if such is employed, or in response to the receipt of the object in the retriever, whereby the balloon 24 may be automatically inflated and released from the retriever at the desired time to draw the tow line 8 into an elevated position generally similar to that illustrated in FIGS. 1 and 2. For the sake of clarity, no attempt has been made to illustrate all of the shroud lines 6 and their specific location about the retriever structure. Likewise, as there are numerous types of devices in use for automatically inflating life rafts and other objects automatically upon the occurrence of certain conditions, the details of the inflating mechanism form no part of the present invention and have not been illustrated in detail. Likewise, it is believed apparent that if the container 1 is generally symmetrical in shape and the shrouds 6 are of substantially uniform length, the shrouds 6 adjacent the ends of the member 11 will be foreshortened and the shrouds would not normally assume a position such as illustrated in FIGS. 1 and 2, the latter figures more or less diagrammatically illustrating the shrouds for the sake of clarity.

FIG. 6 illustrates a modified form of container net wherein the shrouds 6, illustrated as being spaced over 180° of the total circumference of the net, are fixed thereto in the same manner as illustrated in the construction of FIGS. 1, 2 and 4, while each of the lines 2' comprising the remaining lines about the circumference of the net terminate at their free ends in loops 35 through which may extend a single shroud line 6', the free ends of which are secured at 7 to the tow line 8 in the same manner as the lines 6, the line 6' being of such a length that it will function in the manner of a draw string upon pick-up by the aircraft to close the associated half of the container net, this construction eliminating the bunching of the shroud lines adjacent the member 12 of the retriever. This construction also has the advantage that it tends to very quickly close the container net and insure the retention of the object therein during the actual pick-up operation.

The retriever may also be designed for multiple pick-ups whereby a series of pick-up assemblies may be employed, each assembly comprising a container 1, tow line 8, and balloon 24, together with suitable means for successively inflating the balloons, either in the form of individual tanks or suitable valving means for successively filling the balloons from a single supply tank. In such case the container nets of each assembly may be successively applied to the retriever, the eye members 15 being constructed to accommodate the same and each balloon, tow line and shroud assembly being individually packed to permit successive release and inflation thereof.

Referring to FIG. 5, it will be noted that the eye members 15 are constructed with the members 16 being elongated to provide a line receiving eye capable of retaining a plurality of shroud lines 6 in sequential order, whereby the line adjacent the outer end of the eye member is connected to the uppermost container net, the next line with the container not immediately following the first and so on, so that each net may be successively disengaged from the non-rigid object-receiving structure 9.

Thus where several objects are to be picked up, the retriever can be dropped and following pick-up of one, the retriever may be maneuvered to pick up the next object and following the air pick-up thereof, each successive object being similarly handled.

As illustrated in FIG. 3, it may be desirable in some instances to utilize a small drag shoot 36, or other suitable air-supported device such as a kite or glider, which is illustrated as being connected to the tow line 8 at the point 7, the drag shoot 36 being operable to provide a supplemental lift to insure clearance of the object from the ground or water surface.

It will be appreciated that while I have illustrated the retriever structure as being a relatively rigid construction, in some instances, it may be desirable to construct the retriver 9 as a collapsible structure, in which case other suitable means may be provided for containing the gas supply. Such a collapsible construction would be particularly advantageous where the device is to be stored or transported in ships or planes where space is limited.

Likewise, in some instances, it may be desirable to eliminate the member 12, employing suitable means such as weights for maintaining the container net in operable position, in which case the propulsion means and battery therefor could be carried by the member 11 or its equivalent. Similarly in some cases it may be undesirable to employ separate float members with such weights to maintain the container in adjacent receiving position.

It also will be appreciated that the shape of the balloon 24 and the particular line engageable structure for receiving the hook 29 may vary considerably even to the extent of having the hook-engaging elements disposed above the balloon proper, whereby puncturing of the balloon is avoided, enabling its reuse.

It might be mentioned that by suitable design and proportioning of the retriever structure, including the container net, etc., the retriever could be employed for fishing operations.

Having thus described my invention, it will be obvious to those skilled in the art from the disclosure herein given that various immaterial modifications may be made in the same without departing from the spirit of my invention; hence I do not wish to be considered as limiting myself to the exact form, construction, arrangement and combination of parts shown and described, or uses mentioned.

What I claim as new and desire to secure by letters patent is:

1. An air pickup system comprising a tow line, means connected at one end of the line for supporting the same in operative position for interception and pickup by aircraft, a pickup container normally open at the top and at one side thereof operatively connected to the opposite end of said line, and a supporting structure for maintaining the pickup container, prior to pickup, in an object-receiving position, said supporting structure being constructed to float and including means for maintaining the open pickup container in operative position below the water surface for receiving a water borne object.

2. An air pickup system as defined in claim 1, comprising propulsion means carried by said supporting structure and control means for said propulsion means for facilitating the guiding of said structure and open container carried thereby to a water borne object.

3. An air pickup system as defined in claim 2, wherein said control means comprises a radio-operated remote control device.

4. An air pickup system as defined in claim 2, wherein said control means includes a homing device responsive to the water borne object for guiding said structure toward such an object.

5. An air pickup system as defined in claim 2, wherein said line supporting means comprises a single interceptable balloon, gas supply means for inflating said balloon, and said line, line supporting means, gas supply means, pickup container and supporting structure are disposed as a unitary package capable of being dropped from an aircraft to a desired point of usage.

6. An air pickup system as defined in claim 5, wherein said gas supply is provided with control means for facilitating release of the gas and inflation of the balloon following a pickup of a water borne object into the container.

7. An air pickup system as defined in claim 6, wherein said pickup container is detachably carried by said supporting structure whereby the container, at the time of air pickup thereof, is disengaged from said supporting structure.

8. An air pickup system as defined in claim 7, comprising propulsion means carried by said supporting structure and control means for said propulsion means for facilitating the guiding of said structure and container carried thereby to a water borne object.

9. An air pickup system as defined in claim 8, wherein said line supporting means comprises a single interceptable balloon, gas supply means for inflating said balloon, and said line, line supporting means, gas supply means, pickup container and supporting structure are disposed as a unitary package capable of being dropped from an aircraft to a desired point of usage.

10. An air pickup system as defined in claim 9, wherein said gas supply means is provided with control means for facilitating release of the gas and inflation of the balloon following a pickup of a water borne object.

11. An air pickup system as defined in claim 10, wherein a plurality of pickup assemblies, each including a tow line, associated interceptable balloon and pickup container, are disposed in successive arrangement on said supporting means, for sequential usage with each assembly being in operable position following removal of the immediately preceding pickup container.

12. An air pickup system as defined in claim 11, wherein said pickup containers each comprises a net-like structure, said supporting structure being constructed to support the net-like structure in an open position facilitating entry of water borne objects into the net-like structure, said net-like structures being disposed in nested arrangement.

13. An air pickup system as defined in claim 12, wherein said supporting structure is provided with a plurality of line-retaining elements, each adapted to detachably retain a plurality of lines in sequential relationship, each line-retaining element retaining one line from each of a plurality of pickup containers.

14. An air pickup target for aircraft comprising a single interceptable envelope filled with a gas capable of sustaining the filled envelope airborne, net-like line means operatively associated with and carried by the envelope, and a tow line operatively connected to said line means for suspension therefrom, said net-like line means being constructed for engagement with a hook means carried by a pickup aircraft, said line means forming the connecting element between such hook and the tow line.

15. An air pickup target as defined in claim 14, wherein said envelope is constructed of a material which will, upon engagement thereof with a hook, puncture and effect deflation of the envelope to facilitate engagement of such a hook with said net-like line means.

16. An air pickup target as defined in claim 14, wherein said envelope is normally in deflated condition, and gas supply means operatively associated with a normally deflated envelope and constructed to fill the envelope upon desired actuation.

17. An air pickup container for interception and pickup by an aircraft from the surface of a body of water, comprising a non-rigid object-receiving structure having a plurality of openings therein for the drainage of water therefrom, a tow line, a plurality of connecting lines each having one end connected to the non-rigid periphery of said structure and the other end connected to the tow line, the last mentioned ends being joined to the tow line at substantially a common point and the first mentioned ends secured to the structure at spaced points around the periphery of said structure to distribute the container load among said lines, and provide a gathering action of such periphery upon the application of pulling forces to the tow line.

18. An air pickup container for interception and pickup by an aircraft, comprising a non-rigid object-receiving structure, a tow line, a plurality of connecting lines each having one end connected to the non-rigid periphery of said structure and the other end connected to the tow line, the last mentioned ends being joined to said tow line at substantially a common point and the first mentioned ends secured to the structure at spaced points around the periphery of the latter to distribute the container load among said lines and provide a gathering action of such periphery upon the application of pulling forces to the tow line.

19. An air pickup container as defined in claim 18, wherein said object receiving structure is in the form of an open net.

20. An air pickup container as defined in claim 19, wherein each of said connecting lines are connected at their adjacent ends to said net.

21. An air pickup container as defined in claim 19, wherein a plurality of said connecting lines are connected at their adjacent ends to said net, the latter provided with a plurality of eye means thereon and a connecting line extending through said eye means and secured at its ends to said tow line in the nature of a draw string operative to close the container upon the application of towing forces to the tow line at the time of air pickup.

22. A retriever for water borne objects comprising a supporting structure for an object receiving container, means operatively associated with said supporting structure for detachably supporting such a container below the water surface with the container being open at one side and at the top thereof in a position to receive such an object, means on said supporting structure for propelling the retriever through the water, and means operatively associated with said propelling means for controlling said propelling means.

23. A retriever as defined in claim 22, wherein said supporting structure comprises a hollow member containing a gas supply tank for an inflatable balloon.

24. A retriever as defined in claim 22, wherein said supporting structure comprises a member of generally semi-circular shape and of buoyant construction disposed with the spaced ends of the member defining the leading portion of said supporting structure.

25. A retriever as defined in claim 24, wherein said supporting structure is provided with a second downwardly extending semi-circular member having its ends secured to the ends of said first member, the planes of said members extending at substantially right angles to one another.

26. A retriever as defined in claim 22, comprising means carried by said supporting structure for supporting a plurality of object-receiving containers therefrom, whereby said containers may be detached therefrom, one by one, for successive pickup operations.

27. A retriever as defined in claim 26, wherein said supporting means is constructed to support a plurality of such containers in nested relation.

28. A retriever for water borne objects comprising a supporting structure for an object receiving container, said supporting structure comprising a first member of generally semi-circular shape and of buoyant construction, and a second semi-circular member having its ends secured to the ends of said first member, the planes of said members extending at substantially right angles to one another, means operatively associated with said supporting structure for detachably supporting such a container in a position to receive such an object, means on said supporting structure for propelling the retriever through the water comprising a pair of electrically driven propelling units, each carried by said second member adjacent a respective end thereof, battery supply means carried by said second member intermediate said propelling units and forming stabilizing ballast for the retriever, and means operatively associated with said propelling means for controlling the latter.

29. An air pickup system comprising a tow line, air borne means connected at one end of the line for supporting the same in operative position for interception and pickup by an aircraft, a pickup container constructed to be supported in an open position for reception of an object to be picked up, said container being operatively connected to the opposite end of said line, and a supporting structure of non-rigid construction for maintaining the pickup container, prior to pickup, in an object-receiving position, said container being detachably carried by said supporting structure whereby the container, at the time of air pickup thereof, is disengaged from said supporting structure, said pickup container and supporting structure being constructed for disposition as a unitary package capable of being dropped from an aircraft to a desired point of usage.

30. An air pickup system as defined in claim 29, wherein said line supporting means comprises a single interceptable balloon, gas supply means for inflating said balloon, and said line, line supporting means, gas supply means, pickup container and supporting structure are disposed as a unitary package capable of being dropped from an aircraft to a desired point of usage.

31. An air pickup structure comprising a tow line, means at one end of said line for engagement with pickup means on an aircraft, container means at the opposite end of said line, and means including a drag chute operatively associated with said structure adjacent the container end thereof operative for increasing the lifting forces acting upon the container following acceleration thereof subsequent to pickup by an aircraft.

(References on following page)

References Cited by the Examiner

UNITED STATES PATENTS

| | | | |
|---|---|---|---|
| 1,812,955 | 7/31 | Horni | 258—1.2 |
| 2,449,417 | 9/48 | Schultz | 258—1.2 |
| 2,480,145 | 8/49 | Lazarus | 244—3 |
| 2,551,596 | 5/51 | Haglund | 244—3 |
| 2,700,781 | 2/55 | Smith | 9—14 |
| 2,738,939 | 3/56 | Johnson | 9—14 X |
| 2,761,636 | 9/56 | Finlay | 244—113 |
| 2,778,611 | 1/57 | Cotton | 258—1.2 |
| 2,817,860 | 12/57 | Fritz | 9—14 |
| 2,941,492 | 6/60 | Wilcoxon | 9—8 X |

FERGUS S. MIDDLETON, *Primary Examiner.*

MILTON BUCHLER, *Examiner.*